(12) United States Patent
Kraus et al.

(10) Patent No.: US 6,553,608 B2
(45) Date of Patent: Apr. 29, 2003

(54) WIPER ARM FOR WINDSCREEN WIPER

(75) Inventors: Achim Kraus, Buehl (DE); Stephan Mayer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/979,410

(22) PCT Filed: May 16, 2001

(86) PCT No.: PCT/DE01/01017

§ 371 (c)(1),
(2), (4) Date: Nov. 21, 2001

(87) PCT Pub. No.: WO01/72564

PCT Pub. Date: Oct. 4, 2001

(65) Prior Publication Data

US 2002/0157204 A1 Oct. 31, 2002

(30) Foreign Application Priority Data

Mar. 25, 2000 (DE) ......................... 100 15 065

(51) Int. Cl.⁷ ............................. B60S 1/32; B60S 1/34
(52) U.S. Cl. ............................. 15/250.352; 15/250.351
(58) Field of Search ................. 15/250.352, 250.351, 15/250.31, 250.19

(56) References Cited

U.S. PATENT DOCUMENTS

| 2,353,208 | A | * | 7/1944 | Whitted | 15/250.32 |
| 4,170,804 | A | * | 10/1979 | Scotcher | 15/250.34 |
| 4,856,137 | A | * | 8/1989 | Palu | 15/250.31 |
| 5,423,106 | A | * | 6/1995 | Peyret | 15/250.31 |

FOREIGN PATENT DOCUMENTS

| DE | 37 09 994 A | | 10/1987 | |
| DE | 42 02 125 A | | 9/1992 | |
| EP | 565436 | * | 10/1993 | 15/250.352 |
| GB | 2205033 | * | 11/1988 | 15/250.352 |

OTHER PUBLICATIONS

Patent Abstracts of Japan vol. 011, No. 006 (M–551), Jan. 8, 1987 & JP 61 184148 A, Aug. 16, 1986.

* cited by examiner

Primary Examiner—Gary K. Graham
(74) Attorney, Agent, or Firm—Michael J. Striker (57) ABSTRACT

The invention is based on a wiper arm (10) for a windshield wiper comprising a mounting part (12) and an articulated part (14) that are connected to each other via a hinged joint (18) that has a hub (24) permanently connected with one part (14 or 12) and open toward the other part (12 or 14), and an articulated axle (22) permanently connected with the other part (12 or 14), wherein one of the ends of a tension spring (20) is attached to an attachment device (26, 28) of the articulated part (14) and the other end is attached to the mounting part (12), and the hub (24) and the articulated axle (22) mutually loaded in the assembled state, and the hinged joint (18), in a preassembled state of the wiper arm (10) in a defined transport position, grips a seating surface that is situated on the side of the parts named above opposite to the hub (24) in relation to the line of force (46) of the tension spring (20) and is formed by at least one bearing surface (32, 34) on the articulated part (14) and on the mounting part (12) in each case. It is proposed that the bearing surfaces (32, 34) are arranged and/or designed in such a fashion that, with a smaller joint angle (φ) beyond the transport position, the articulated axle (22) moves from its seating surface at the hub (24) toward the open end (48) and thereby increases the preload on the tension spring (20).

7 Claims, 7 Drawing Sheets

WIPER ARM FOR WINDSCREEN WIPER

PRIOR ART

The Invention is based on a wiper arm for windshield wiper.

Known windshield wipers have a wiper arm that comprises a mounting part and an articulated part—with a wiper bar—hinge-mounted on it. A wiper blade is hinge-mounted on this, which wiper blade is constructed out of a carrier strap system having a primary middle strap and secondary, intermediate straps connected in hinged fashion, as well as claw strips, and a wiper strip. Simple systems have only one middle strap, on which the claws are provided.

On its end facing the mounting part, the articulated part comprises a spring chamber. The spring chamber is open toward the window and has an extension designed in the shape of a slot toward the wiper bar with a crossbar to which a retaining clip of the tension spring is attached. A C-bracket is arranged on the other end of the tension spring, which is attached to an attachment device of the mounting part. The articulated part can thereby rest against a bolt-shaped articulated axle of the mounting part via an open hub. A wiper arm is made known in DE 37 09 994 A1 in which the open hub is provided on the mounting part, and the articulated axle is provided on the articulated part. The joint formed in this fashion—also referred to as a hinged joint—and the attachment device of the tension spring are arranged in relation to each other in such a fashion that the tension spring pulls the articulated part and the wiper bar in the direction of a front window or rear window of a vehicle. The wiper blade therefore lies against the vehicle window under the force of the tension spring and is limited in the working position by this.

The articulated part of the windshield wiper can be swung away from the vehicle window to clean or install the wiper blade. To accomplish this, the articulated part is swivelled around the hinged joint so far that the resultant line of force of the tension spring exceeds the articulated axle toward the outside, and the tension spring pulls the articulated axle against a stop on the mounting part in a swung-out position. In order to achieve a secure lock in the swung-out position—which makes installation easy without the articulated part with the wiper bar slamming back against the vehicle window—the articulated part must be rotated fairly far around the articulated axle, and the wiper bar must be moved far away from the vehicle window. If, in undesired fashion, the wiper bar leaves the swung-out position and slams against the vehicle window before installation of the wiper blade is complete, the vehicle window or the wiper arm can be damaged.

In the preassembled state, in the delivered position, the hinged joint is held together by a preload of the tension spring. Bearing surfaces are provided on the mounting part and the articulated part for this purpose, which support the hinged joint on the side opposite to the hub in relation to the line of application of the tension spring. A statically stable position of these parts is given when the line of force of the tension spring extends between the support points on the articulated axle and on the bearing surfaces. As a result of a slight effect of force on the preassembled wiper arm, e.g., caused by shaking during transport or careless handling, the bearing surfaces can mutually shift and slide off of each other, so that the articulated axle slips out of the hub, and the hinged joint falls apart into its individual components. Additional assembly work is required as a result, and there is a risk that parts will become lost.

ADVANTAGES OF THE INVENTION

According to the invention, the bearing surfaces are arranged and/or designed in such a fashion that, with a smaller joint angle $\phi$ beyond the transport position, the articulated axle moves from its seating surface in the hub toward the open end, thereby increasing the preload of the tension spring. Advantageously, one bearing surface on the mounting part or on the articulated part is concave in each case, while the other bearing surface on the other part is designed correspondingly convex in each case. The concave bearing surface thereby comprises a lobe designed in the shape of a cam toward the outside in relation to the line of force of the tension spring. The bearing surfaces designed in this fashion secure a defined position of the parts named above in the preassembled state of the wiper arm in that they form a type of spring detent. If transverse forces or a torque that has the tendency to decrease the joint angle $\phi$ beyond the transport position act on the parts as a result of shaking or a bump, the convex bearing surface—guided by the joint bolt in the open hub—slides along the lobe designed in the shape of a cam, and the distance between the attachment devices of the tension spring increase as a result and, as a consequence, the preload of the spring increases. After the stress, the parts are returned to their starting position—with elimination of part of the preload—so that they cannot continue to come loose during repeated shaking or bumping, in that they slide off of each other bit by bit.

For easier installation, a starting ramp is formed as part of the lobe toward the outside, via which the convex bearing surface can be easily guided over the cam-shaped lobe into the concave bearing surface. Basically, the bearing surfaces can be provided at a random location of the mounting part or the articulated part. The object of the invention can be attained particularly simply when the contour of the attachment device of the tension spring on the mounting part is designed cylindrical in shape toward the articulated part and serves as a bearing surface.

According to an embodiment of the invention, the articulated part—when moved into a swung-out position with a joint angle $\phi$ greater than 180°—reaches a stop for seating and rests against it. Moreover, a latching cam with a latching recess abuts the concave bearing surface on the other side of the hub toward the open end, into which latching recess the convex bearing surface snaps in the swung-out position. The latching cam is arranged toward the stop in such a fashion that the articulated axle is displaced in the swung-out position by a displacement length toward the open end of the hub, and the line of force of the tension spring extends between the stop and the latching recess. In the swung-out position, the articulated part therefore rests against the stop and the latching cam, the position of which can be freely selected, so that a random swung-out angle is achieved and can be harmonized with the circumstances of the vehicle.

The latching cam can be eliminated if, according to a further embodiment of the invention, the stop for limiting the swung-out angle is designed as a spring detent, and the tension spring serves as a stop spring. Advantageously, the spring detent has a convex latching element that is arranged on the mounting part or on the articulated part and, in the swung-out position of the articulated part, snaps into a latching recess on the other part in each case, and, during the process of snapping into place, the articulated axle comes slightly loose from its seating in the open hub, and the preload on the tension spring increases. The articulated part with the wiper bar is therefore held securely in a swung-out position with a small swung-out angle.

DIAGRAM

Further advantages arise from the following diagram description. Exemplary embodiments of the invention are presented in the diagram. The diagram, the description, and the claims contain numerous features in combination. It is appropriate one skilled in the art to also examine the features individually and combine them into additional logical combinations.

DESCRIPTION OF THE EXEMPLARY EMBODIMENTS

Figure 1:
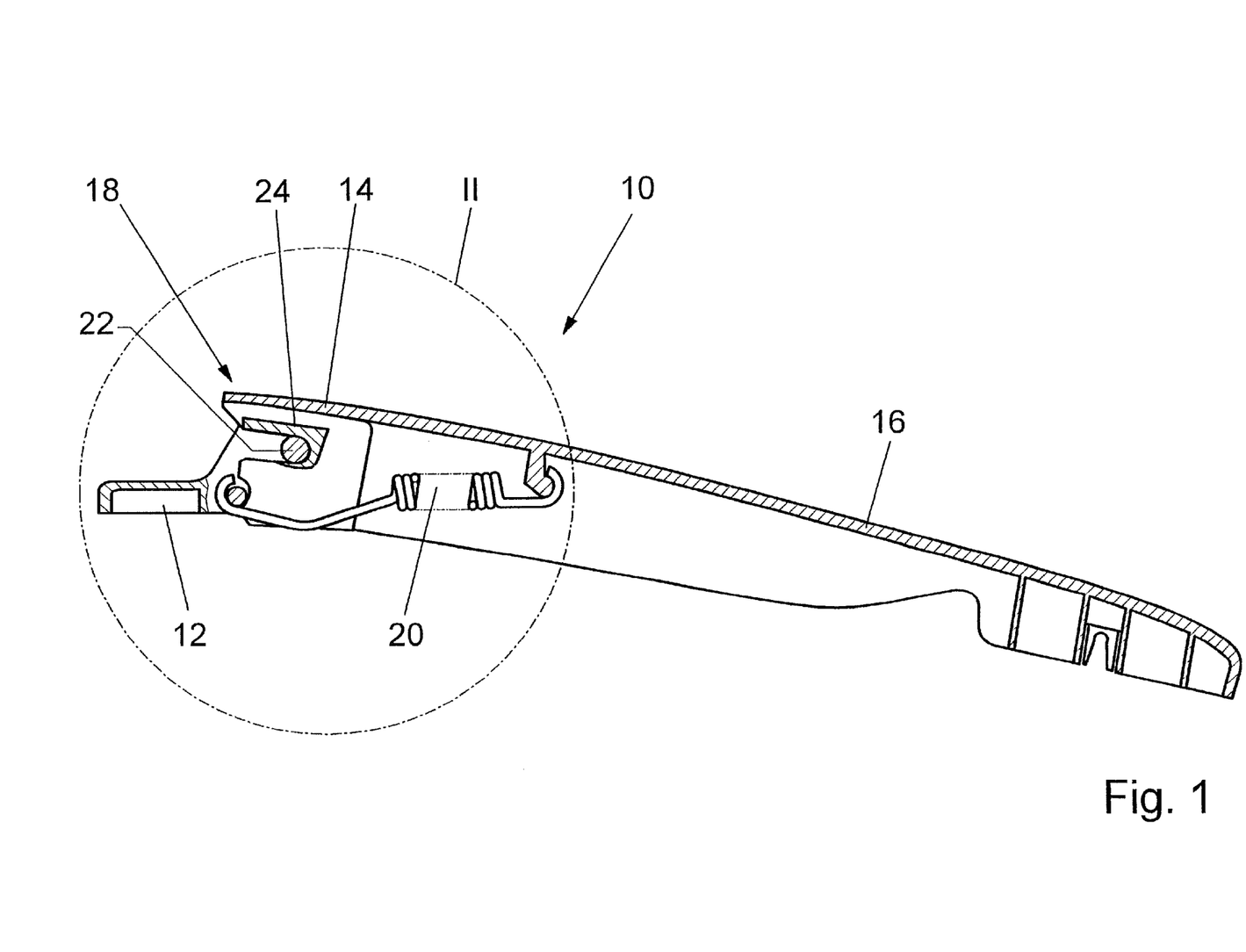
FIG. 1 shows a longitudinal sectional view through a wiper arm according to the invention in a preassembled state.

A wiper arm 10 is basically composed of a mounting part 12 and an articulated part 14 with an integrally moulded wiper bar 16 (FIG. 1). A wiper blade—not shown further—can be hinge-mounted on the exposed end of the wiper bar 16. The mounting part 12 is connected with the articulated part 14 by means of a hinged joint 18. In the preassembled transport position shown, both parts are mutually loaded by means of a tension spring 20.

Figure 2:
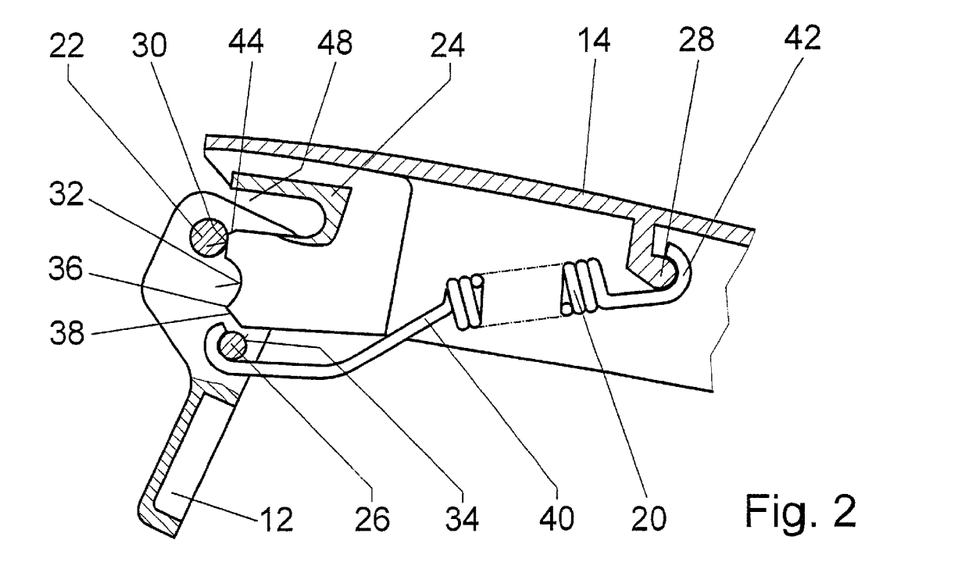
FIG. 2 shows an enlarged section II according to FIG. 1 at the start of assembly.
Figure 5:
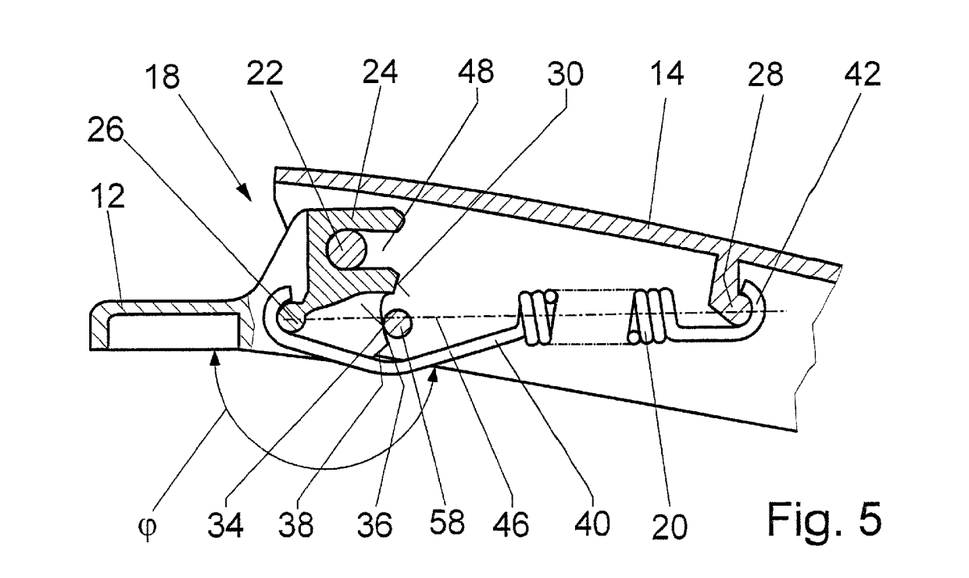
FIG. 5 shows a variant of FIG. 4.
Figure 12:
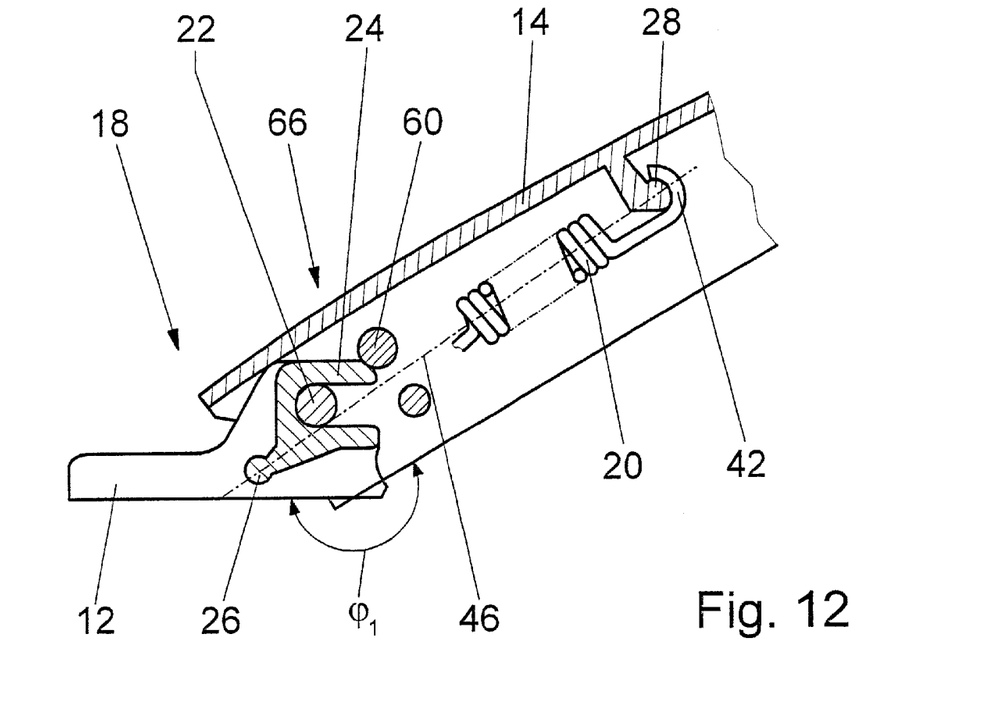
FIG. 12 shows a variant of FIG. 10.
Figure 13:
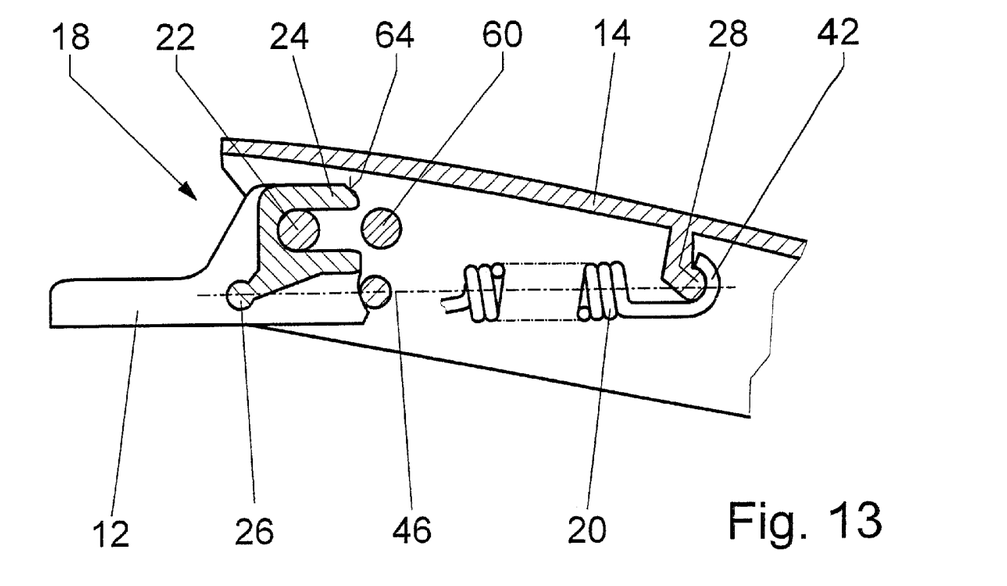
FIG. 13 shows a variant of FIG. 11.

The outer part of the hinged joint 18 is formed by a hub 24 that is permanently connected to the articulated part 14 and is open toward the mounting part 12, in which hub 24 a bolt-shaped articulated axle 22 permanently connected to the mounting part 12 is supported (FIG. 2). A reverse arrangement is also possible, however, in which the hub 24 is permanently connected to the mounting part 12, and the articulated axle 22 is permanently connected to the articulated part 14 (FIGS. 5, 12, 13). Surfaces 30 are integrally moulded on the side of the hub 24 pointing toward the tension spring 20, which surfaces 30 are separated by a slit in which a C-bracket 40 of the tension spring 20 can slide while the articulated part 14 moves. The two surfaces 30 extend parallel to the longitudinal axis of the hub 24 and, with an open end 48 of the hub 24 directed toward the mounting part 12, form an obtuse, preferably nearly right angle. They comprise a concave bearing surface 32 in each case at a distance from the open end 48.

Figure 4:
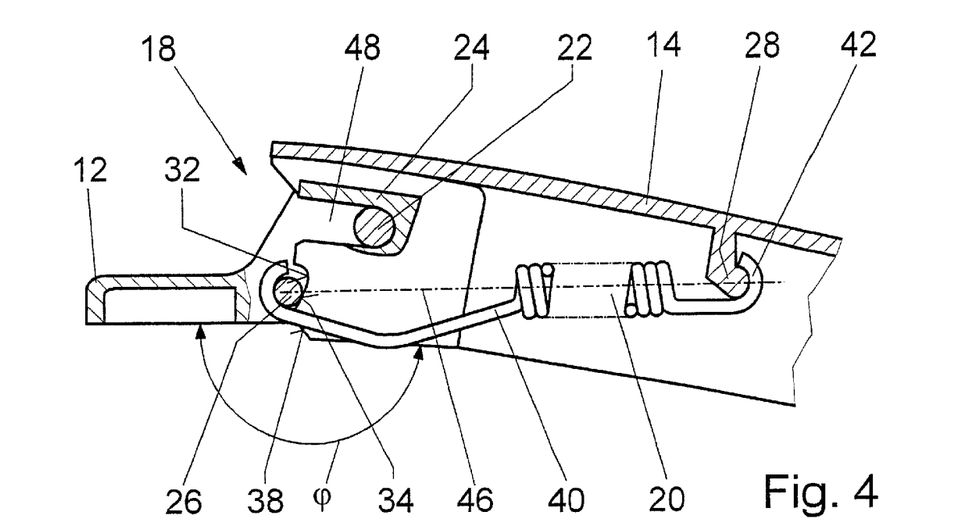
FIG. 4 shows an enlarged section II according to FIG. 1.

An attachment device 26 for the tension spring 20 permanently connected with the mounting part 12 has a cylindrical contour on the side facing the articulated part 14, which forms a convex bearing surface 34 on both sides of the C-bracket 40, which touches the concave bearing surfaces 32 of the articulated part 14 in the preassembled state (FIG. 4). The tension spring 20, which loads the parts 22, 24 of the hinged joint 18, is attached to an attachment device 28 on the articulated part 14. The line of force 46 of the tension spring 20 thereby extends between the two support points formed by the articulated axle 22 in the hub 24 and the bearing surfaces 32 and 34. In the embodiment according to FIG. 5, a pin 58 is provided in the articulated part 14, against which the cylindrical bearing surface 34 is situated.

The concave bearing surface 32 comprises a cam-shaped lobe 36 on the side lying toward the outside in relation to the line of force 46 of the tension spring 20. The lobe 36 extends in the direction of the line of force 46 and has a greater distance from the attachment device 28 than the concave bearing surface 32. It therefore acts as a spring detent, because the cylindrical bearing surface 32 can overcome the lobe 36 and leave the latching position only if the preload on the tension spring 20 is increased, so that the articulated axle 22 can be rotated out of the open hub 24.

Figure 3:
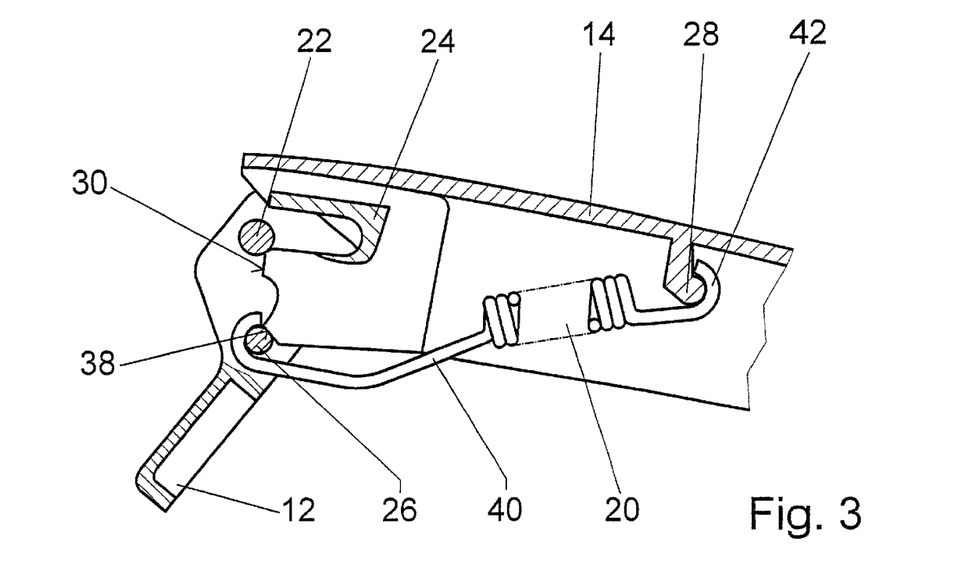
FIG. 3 shows an enlarged section according to FIG. 1 in an advanced stage of assembly.

Before the wiper arm 10 is assembled, the bracket 40 of the tension spring 20 is attached to the attachment device 26 on the mounting part 12, and the bracket 42 of the tension spring 20 is attached to the attachment device 28 on the articulated part 14 (FIG. 2). The articulated axle 22 of the hinged joint 18 touches the surfaces 30. If the articulated part 14 is moved counterclockwise, the articulated axle 22—with preloading of the tension spring 20—travels over a chamfer 44 into the open hub 24, and the convex bearing surface 34 now rests against a starting ramp 38 integrally moulded with the rob 36 (FIG. 3). If the articulated part 14 is then moved further in the same direction, the convex bearing surface 34 slides with the starting ramp 38 up to the lob 36 and snaps into the concave bearing surface 32, while the articulated axle 22 rests on the closed end of the hub 24. For disassembly, the preload on the tension spring 20 must be increased in order to overcome the lob 36. This prevents the hinged joint 18 from unintentionally falling apart during transport.

Figure 6:
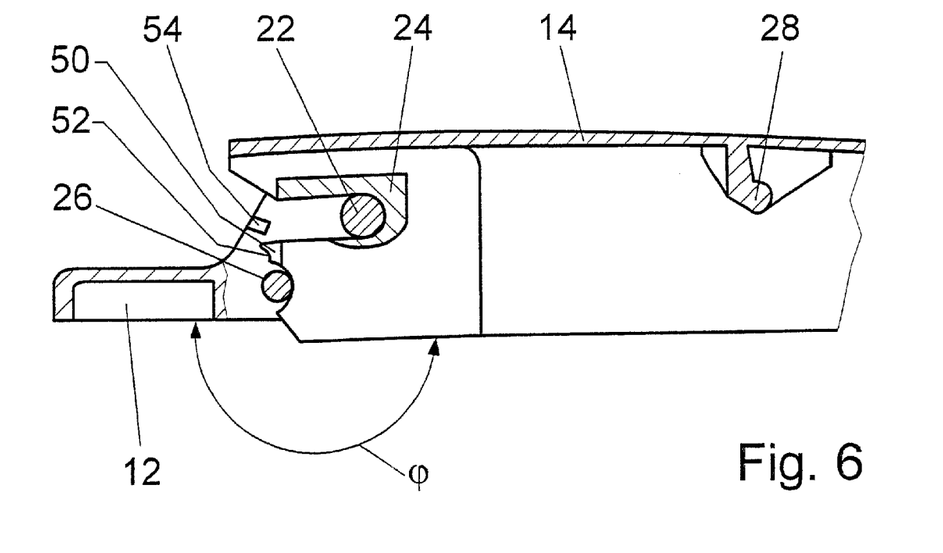
FIG. 6 shows a variant of FIG. 4.
Figure 7:
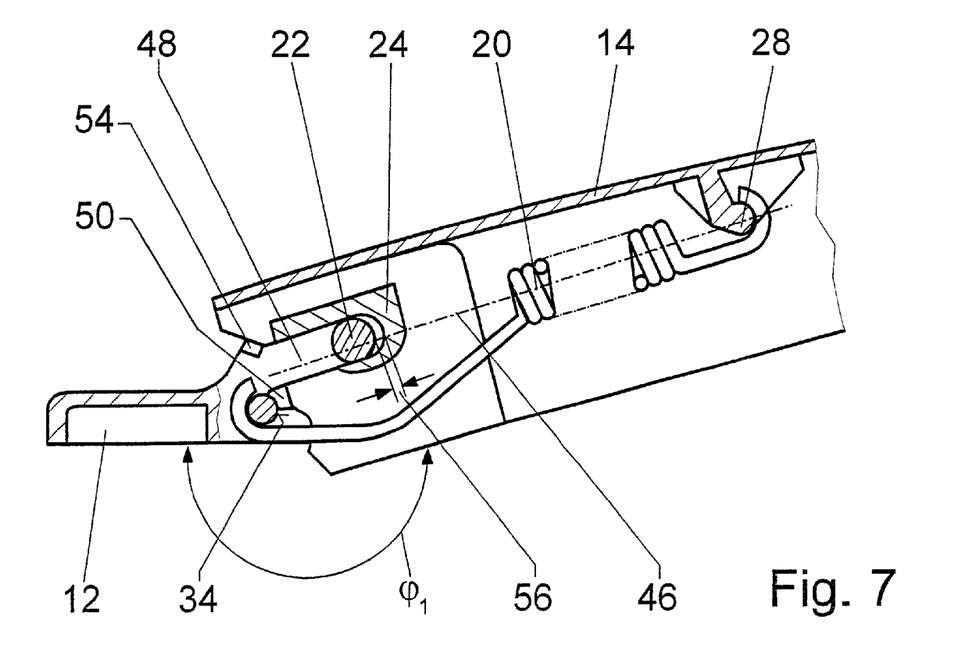
FIG. 7 shows the embodiment according to FIG. 6 in a swung-out position.

In the embodiment according to FIGS. 6 and 7, the mounting part 12 comprises a stop 54, against which the articulated part 14 rests in a swung-out position (FIG. 7). If the angle $\phi$ between the mounting part 12 and the articulated part 14 is increased slightly, the articulated axle 22 shifts by a displacement length 56 toward the open end 48 of the hub 24, and the convex bearing surface 34 snaps into the latching recess 52 of the latching cam. As a result, a considerably flatter swung-out position with a smaller swung-out angle $\phi_1$ can be achieved than if the line of force 46 of the tension spring 20 would have to exceed the articulated axle 22 toward the outside.

Figure 8:
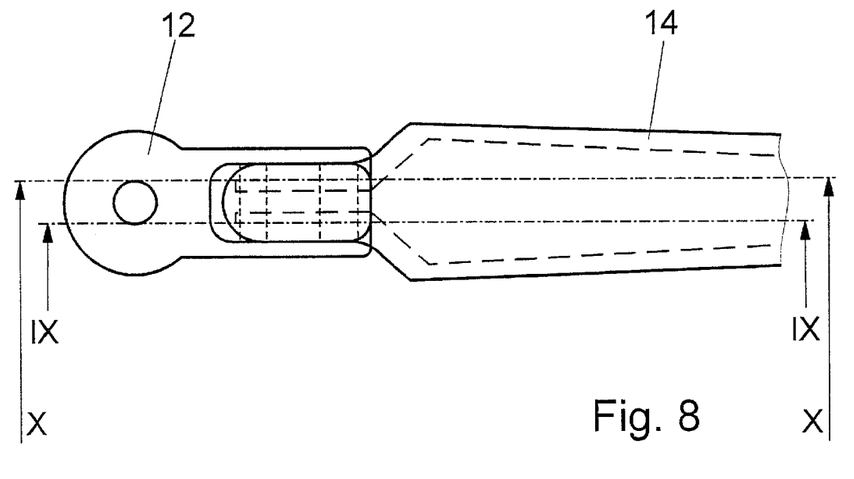
FIG. 8 shows the region II in FIG. 1 in a top view.
Figure 9:
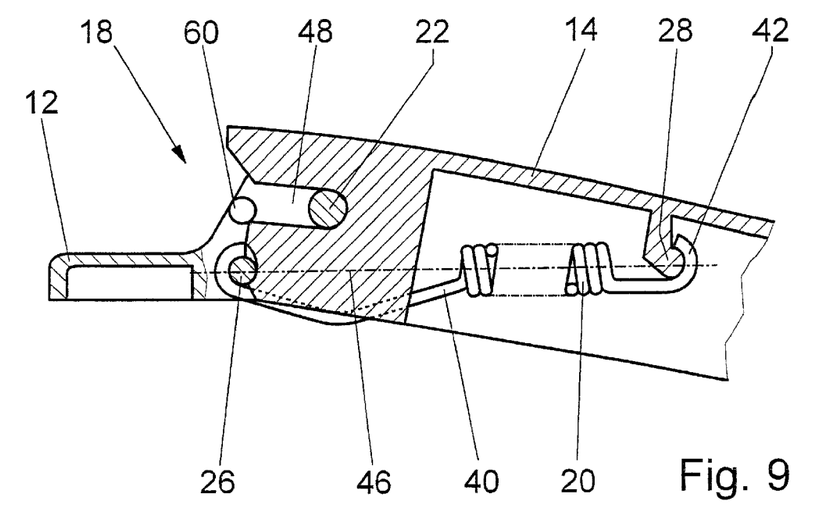
FIG. 9 shows a sectional drawing along the line IX—IX in FIG. 8.
Figure 10:
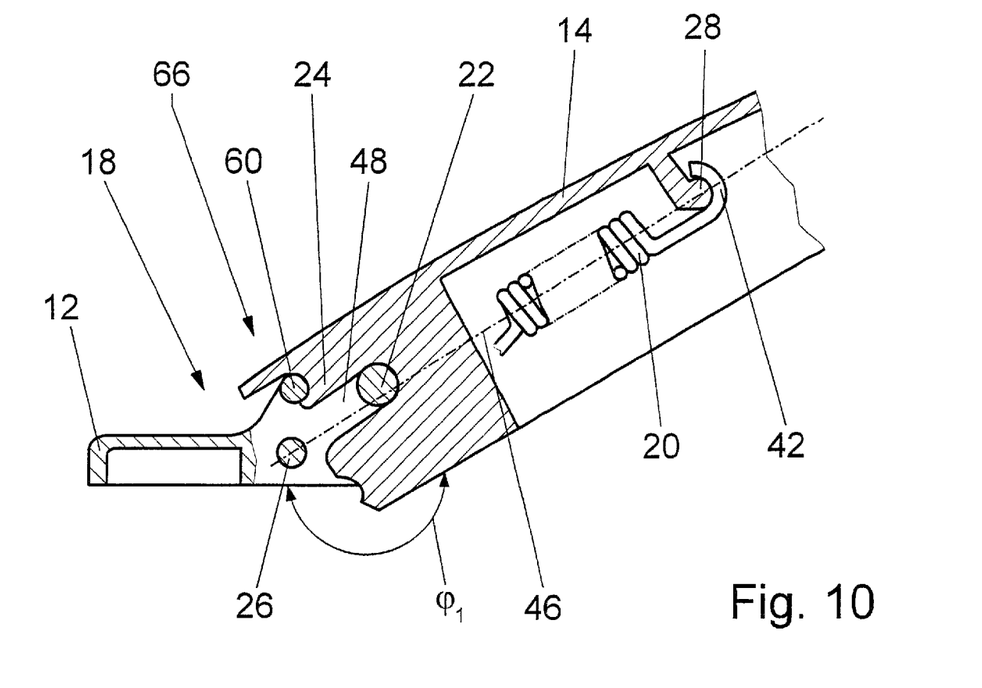
FIG. 10 shows a sectional drawing along the line X—X in FIG. 9 in a swung-out position of the articulated part.
Figure 11:
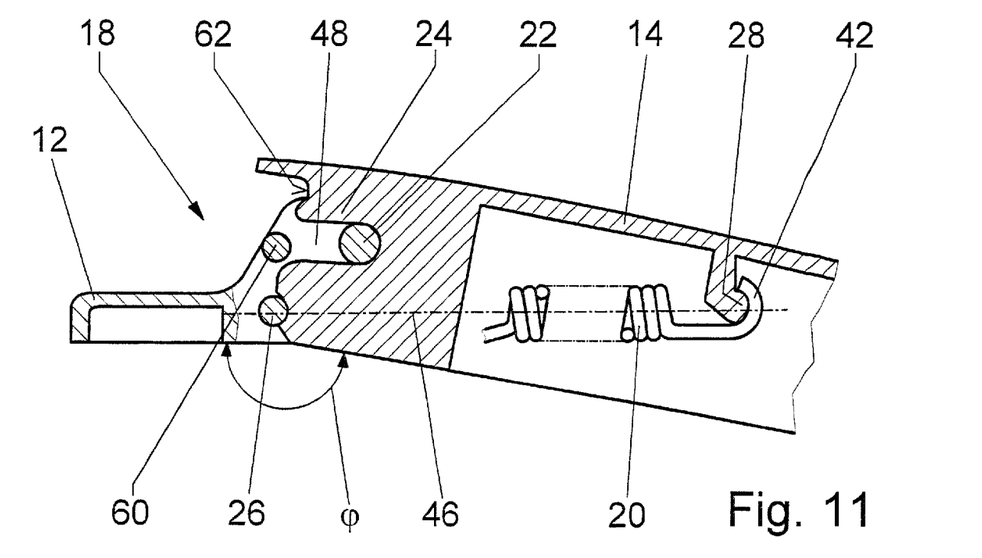
FIG. 11 shows a sectional drawing along the line X—X in FIG. 8 in a transport position of the articulated part.

The top view according to FIG. 8 shows the cutting planes IX—IX and X—X for FIGS. 9 through 13. The sectional drawings shown in FIG. 9 through FIG. 11 show an exemplary embodiment, while the sectional drawings shown in FIGS. 12 and 13 concern a variant. In both embodiments, a stop 66 for limiting the swung-out angle $\phi$ is designed as spring detent in that a latching element 60 in the swung-out position (FIG. 10 or FIG. 12) snaps into a latching recess 62 or 64. The tension spring 20 thereby acts as stop spring in that its preload exceeds a maximum during the process of snapping into place. The articulated part 14 is therefore held securely in the swung-out position. The embodiment according to FIG. 9 through FIG. 11 basically differs from the variants according to FIG. 12 and FIG. 13 by the arrangement of the open hub 24. In fact, this is arranged on the articulated part 14 on the one hand and, on the other, on the mounting part 12, while the articulated axle 22 is provided on the other part 12 or 14 in each case.

What is claimed is:

1. A wiper arm for a windshield wiper, comprising a mounting part; an articulated part; a hinged joint connecting said mounting pad and said articulated part with one another and having a hub permanently connected with one of said parts and open toward another of said parts; an articulated axle permanently connected with the other pad, said articulated part being provided with an attachment device; a tension spring having one end attached to said attachment device of said articulated part and another end attached to said mounting part, so that said hub and said articulated axle being mutually loaded in an assembled state, said hinged joint in a preassembled state of the wiper arm in a defined transport position having gripping seating surfaces provided on a side of said parts opposite to said hub in relation to a line of force of said tension spring and being formed by at least one bearing surface on said articulated part and said mounting part, said bearing surfaces being formed so that said articulated axle moves beyond the transport position, away from the hub, with a small joint angle rotation of said articulated part and said axle moves from a seating surface at said hub toward an open end and thereby it increases a preload of said tension spring.

2. A wiper arm as defined in claim 1, wherein one of said bearing surfaces is concave and the other of said bearing surfaces is correspondingly convex, said concave bearing surface including a lobe on a side lying toward an outside in relation to the fine of force of said tension spring, against which said one bearing surface is pressed when said articulated axle moves toward said open end of said hub.

3. A wiper arm as defined in claim 2, and further comprising a starting ramp which is integrally formed toward an outside of said lobe.

4. A wiper arm as defined in claim 2, and further comprising a stop; and a latching cam having a latching recess, said articulated part when moved into a swung-out position with a joint angle greater than 180°, reaching said stop for seating and resting against said stop, said latching cam having said latching recess abutting said concave bearing surface toward said open end of said hub, into which said convex bearing surface snaps into place in the swung-out position, wherein said latching cam being arranged relative to said stop so that said articulated axle is displaced by a displacement length toward said open end of said hub, and the line of force of said tension spring extending between said stop and said seating surface of said bearing surface of said mounting part in said latching recess.

5. A wiper arm as defined in claim 1, wherein said attachment device of said tension spring on said mounting part is cylindrical toward said articulated part and serves as said bearing surface on said mounting part.

6. A wiper arm as defined in claim 1; and further comprising a stop, said articulated part when moved into a Swung-out position having a joint angle greater than 180°, reaching said stop for seating, said stop being formed as a spring detent, while said tension spring serves as a stop spring.

7. A wiper arm as defined in claim 6, wherein said spring detent has a convex latching element which is arranged on one of said parts and, in the Swung-out position of said articulated part, snaps into a latching recess on another of said parts, said articulated axle when snapped into place, loosening slightly from its seating surface In said open hub and a pre-load of said tension spring increases.

* * * * *